June 10, 1969  J. A. MYERS  3,448,653
QUICK DISCONNECT
Filed Jan. 29, 1968
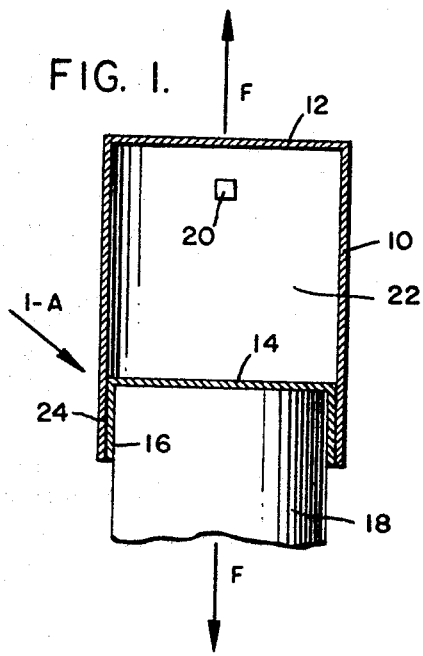
FIG. I.
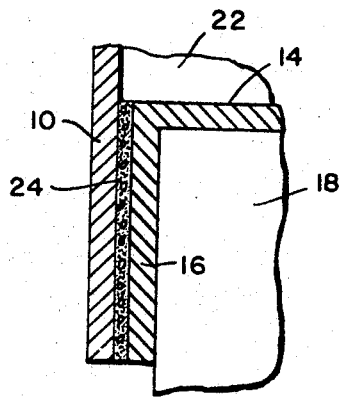
FIG. I-A.
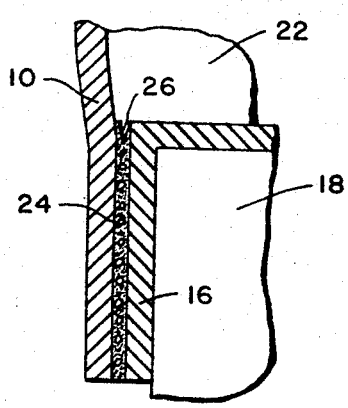
FIG. I-B.
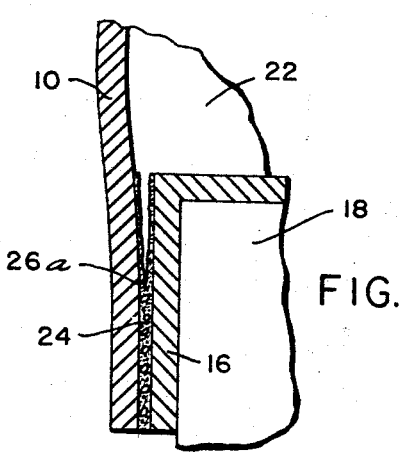
FIG. I-C.
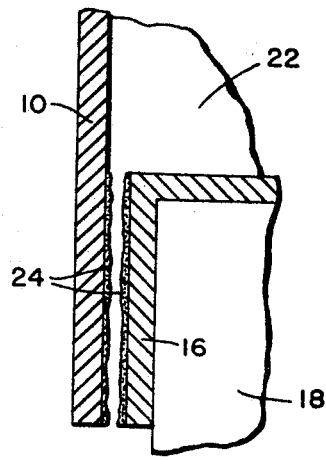
FIG. I-D.
*INVENTOR.*
JACK A. MYERS
BY
V. C. MULLER
ROY MILLER
ATTORNEYS.

3,448,653
QUICK DISCONNECT
Jack A. Myers, China Lake, Calif., assignor to the United States of America as represented by the Secretary of the Navy
Filed Jan. 29, 1968, Ser. No. 701,272
Int. Cl. F41f
U.S. Cl. 89—1　　　　　　　　　　　　　　　3 Claims

ABSTRACT OF THE DISCLOSURE

Tubular member telescopically receives an epoxy cemented member which is separated, when desired, by gas pressure in the tubular member. Prior to separation, an axial tensile load between the members is resisted by the shear characteristics of the cement. The wall of the tubular member is proportioned to the pressure so that it permanently expands slightly, causing the cement to progressively fail in tension.

BACKGROUND OF THE INVENTION

Explosively operated quick disconnect devices have been proposed for various purposes including separation of a parachute from a suspended store to be delivered to the ground or water, separation of parts of space vehicles, and the like. Patent 3,071,404 is exemplary of such devices.

BRIEF DESCRIPTION OF THE DRAWING

FIG. 1 is a longitudinal central section of the subject of the invention;

FIG. 1A is an enlarged section of portion 1A, FIG. 1;

FIG. 1B is a like section at an initial stage of separation;

FIG. 1C is a like section at an intermediate state of separation; and

FIG. 1D is a like section just prior to separation.

DESCRIPTION OF THE PREFERRED EMBODIMENT

Referring to FIG. 1, the two members which are to be separated comprise a tube 10 closed by an end wall 12, and a tube 16 closed by an end wall 14. Tube 10 may be connected to a parachute (not shown) and tube 16 may be connected to a payload 18, such as a smoke bomb or other munition. A detonator 20 is contained within closed chamber 22, or communicates therewith, for pressurizing the chamber when separation is desired. Prior to separation, the two tubes are retained together by a layer of epoxy adhesive 24.

In the operation of the device, it will first be assumed that a tensile force F is applied between tube 10 and the payload. This may be the sudden snatch force of deceleration when a parachute deploys. At this time, the cement is subjected to shear which is the strongest characteristic of certain epoxy cements. When it is desired to separate the payload from tube 10 and the attached parachute, detonator 20 is initiated, pressurizing chamber 22 and producing a shock wave which is transmitted to the cement. It is believed that the compressive front of the shock wave interacts with the tensile tail of the wave to cause fracturing of the adhesive bond. Also, a peeling action takes place which is illustrated in FIGS. 1B, 1C and 1D (shown greatly exaggerated). In FIG. 1B the pressure within chamber 22 has circumferentially stressed tube 10 beyond its elastic limit, producing a slight permanent deformation. The outward expansion of the tube stresses the adhesive in tension, first at a circumferential locus 26, producing separation and permitting pressure to be applied to the now fractured locus. This action continues along adjacent loci, progressively rupturing the adhesive in tension. FIG. 1C illustrates an intermediate stage of the cement rupture to a locus 26a, and FIG. 1D illustrates complete rupture. Tube 10 is now permanently expanded to a slightly larger diameter and the pressure in the chamber expels tube 16. Tube 10 is thus progressively peeled away from tube 16 by a high tensional force per unit area of the adhesive, as distinguished from separation by shear acting on the entire area of the adhesive.

In an operational embodiment of the invention tubes 10 and 16 were constructed of anodized 2420–T4 aluminum, the inside diameter of tube 10 being about .81″ with a wall thickness of about .020″ and a length of about 1.20″. The length of the cement bond was about .300″, the cement being Epoxolite 3351, manufactured by the Epoxolite Corp., El Monte, Calif. The detonator contained 19 mg. of RDX and a 15 mg. primer mixture. This produced about .005″ diameter expansion of tube 10.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:
1. Separation apparatus, comprising:
   (a) a circular tubular member closed at one end;
   (b) a cylindrical member disposed within the other end of the tubular member and forming a chamber between same and said first named end;
   (c) an adhesive disposed between the periphery of the cylindrical member and the inner surface of said tubular member; and
   (d) means for pressurizing said chamber to a pressure sufficient to produce a slight permanent expansion of the diameter of said tubular member, to thereby produce an initial failure of said adhesive in tension at an initial circumferential locus adjacent said chamber, and progressing in a direction away from said chamber, whereby said tubular member is peeled away from said circular member.
2. Apparatus in accordance with claim 1 wherein said adhesive is of the epoxy type.
3. Apparatus in accordance with claim 2 wherein said means for pressurizing comprises a detonator.

References Cited
UNITED STATES PATENTS

| | | | |
|---|---|---|---|
| 2,892,452 | 6/1959 | Weinstock | 89—1 X |
| 3,080,815 | 3/1963 | Simshauser | 89—1 X |
| 3,176,573 | 4/1965 | Dickie | 89—1 X |
| 3,200,706 | 8/1965 | Kinard | 89—1 |

SAMUEL W. ENGLE, *Primary Examiner.*

U.S. Cl. X.R.

102—1; 220—47, 89